(12) United States Patent
Misawa et al.

(10) Patent No.: US 7,815,345 B2
(45) Date of Patent: Oct. 19, 2010

(54) VEHICLE-PURPOSE LIGHTING TOOL

(75) Inventors: Akihiro Misawa, Aichi-ken (JP); Tetsuya Arakawa, Aichi-ken (JP); Tatsuya Oba, Aichi-ken (JP); Akihiko Ishikawa, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 218 days.

(21) Appl. No.: 12/153,595

(22) Filed: May 21, 2008

(65) Prior Publication Data

US 2008/0291685 A1 Nov. 27, 2008

(30) Foreign Application Priority Data

May 22, 2007 (JP) .......................... P. 2007-135639

(51) Int. Cl.
*F21V 5/00* (2006.01)
(52) U.S. Cl. ....................... 362/327; 362/299; 362/309; 362/511
(58) Field of Classification Search ................. 362/299, 362/300, 307, 308, 309, 327, 487, 488, 503, 362/511, 522, 541
See application file for complete search history.

(56) References Cited

U.S. PATENT DOCUMENTS

| | | | | | |
|---|---|---|---|---|---|
| 4,912,606 | A | * | 3/1990 | Yamamoto | 362/522 |
| 4,916,592 | A | * | 4/1990 | Sultan et al. | 362/299 |
| 4,929,866 | A | * | 5/1990 | Murata et al. | 362/511 |

FOREIGN PATENT DOCUMENTS

JP    2005-123092    5/2005

* cited by examiner

*Primary Examiner*—Y My Quach Lee
(74) *Attorney, Agent, or Firm*—McGinn IP Law Group PLLC

(57) ABSTRACT

A vehicle-purpose lighting tool is featured by comprising: a light-conducting member having a front light-emitting plane, a rear plane having a concave/convex shape, and a side edge plane; and a light source arranged at a position opposite to the side edge plane; in which within external light which is entered via the front light-emitting plane into the light-conducting member, a portion of the external light which is directly traveled to the side edge plane is totally reflected on a boundary plane of the side edge plane portion; a plurality of reflecting portions are formed on the rear plane and are coupled to each other via a coupling portion in such a direction that the reflecting portions are separated apart from the side edge plane side; and distances between the plurality of reflecting portions and the front light-emitting plane are changed in a discontinuous manner along the separating direction.

6 Claims, 8 Drawing Sheets

VEHICLE-PURPOSE LIGHTING TOOL

BACKGROUND OF THE INVENTION

1. Field of the Invention

The present invention is related to a vehicle-purpose lighting tool. More specifically, the present invention is directed to an improvement of such vehicle-purpose lighting tools as rear combination lamps.

2. Description of the Related Art

In vehicle-purpose lighting tools such as rear combination lamps and high-mounted stop lamps, light of light sources is radiated outside the light sources via outer lenses (designed covers) so as to obtain desirable light emissions. For instance, as indicated in FIG. 8, in a rear combination lamp where LED lamps 102 are employed as light sources, the LED lamps 102 are installed inside an outer lens 101, and reflectors 103 are provided at peripheral portions of the LED lamps 102 (refer to, for instance, patent publication 1). In the above-described structure, light of the LED lamps 102 is directly traveled to the forward direction, or is traveled via the reflectors 103, and then, is radiated through the outer lens 101 to an external space.

Patent Publication 1. JP-A-2005-123092

Among the above-described combination lamps and the like, in which LED lamps are employed as light sources, it is not desirable that the LED lamps are visually recognizable outside the rear combination lamps, except for such a case: That is, it is desirable in view of design aspects that these LED lamps are actively disclosed. To this end, optical diffusion processing operations (for example, very fine grooves are formed) are carried out with respect to front surfaces of outer lenses, and shapes of reflectors are re-arranged, so that fluctuations in luminance may be reduced in order that the LED lamps may not be conspicuous. However, as long as the LED lamps have been arranged inside the outer lenses, there is such a fact that the LED lamps are positioned on lines of sight of viewers. Accordingly, even when the above-explained measures have been taken, it is practically difficult that the presence of these LED lamps is completely concealed. On the other hand, improvements in designs as to rear combination lamps are expected.

SUMMARY OF THE INVENTION

As a consequence, the present invention has an object to provide a vehicle-purpose lighting tool having a high design characteristic and capable of avoiding that a light source is directly and visually recognizable.

In order to solve the above-described problems, a vehicle-purpose lighting tool, according to the present invention, is constituted by the below-mentioned structures: That is, the vehicle-purpose lighting tool is characterized by comprising:

a light-conducting member having a front light-emitting plane, a rear plane having a concave/convex shape, and a side edge plane; and a light source arranged at a position opposite to the side edge plane; in which within external light which is entered via the front light-emitting plane into the light-conducting member, a portion of the external light which is directly traveled to the side edge plane is totally reflected on a boundary plane of the side edge plane portion;

a plurality of reflecting portions are formed on the rear plane and are coupled to each other via a coupling portion in such a direction that the reflecting portions are separated apart from the side edge plane side; and distances between the plurality of reflecting portions and the front light-emitting plane are changed in a discontinuous manner along the separating direction.

In the above-described structure, such a light that is directly traveled to the side edge plane of the light-conducting member is totally reflected among the external light which is entered via the front light-emitting plane into the light-conducting member. Since the external light is totally reflected in the above-described manner, the light source can be hardly and visually recognized through the front light-emitting plane of the light-conducting member. In other words, it is possible to effectively avoid that the light source is directly and visually recognized through the front light-emitting plane of the light-conducting member.

On the other hand, the reflecting portions are arrayed via the coupling portion in the direction along which the reflecting portions are separated from the side edge plane in such a manner that the distances between these reflecting portions and the front light-emitting plane are changed in the discontinuous manner. As a result, a thicker thickness portion of the light-conducting member is located adjacent to a thinner thickness portion thereof. As a consequence, when the light-conducting member is observed from the front plane thereof, a difference between the thicknesses of the light-conducting member is emphasized, so that deep depth feelings may be increased. As a result, a higher design characteristic may be achieved. Also, a space portion is formed of the concave/convex portions of the rear plane of the light-conducting member, so that the incident light passes through this space portion to be traveled, and then, the traveled light is entered into the reflecting portions positioned apart from the light source. Since a sufficiently large amount of the light is also entered into the reflecting portions positioned apart from the light source, luminance of light that is emitted from the front light-emitting plane is made uniform, and the light can be effectively utilized.

BRIEF DESCRIPTION OF THE DRAWINGS

FIG. 5 is a diagram for explaining an angle defined between a front light-emitting plane 12 of a light-conducting member 11 and a light incident plane 14a.

DESCRIPTION OF THE PREFERRED EMBODIMENTS

In a vehicle-purpose lighting tool of the present invention, light of a light source, which has been conducted to a light-conducting member, is reflected on a reflecting portion of the light-conducting member, which is provided on the side of a rear plane of the light-conducting member, so that the conducted light of the light source is converted to such a light directed to a front plane direction of the light-conducting member. As a result, the light is finally radiated from the front plane of the light-conducting member. As previously described, in the vehicle-purpose lighting tool of the present invention, the front plane of the light-conducting member constitutes a light-emitting plane, namely, an outer front plane of a lighting tool. In other words, when the lighting tool of the present invention is viewed from an external space, the light-emitting plane of the light-conducting member may be directly viewed (namely, may be viewed without via a cover, or the like).

In the vehicle-purpose lighting tool of the present invention, the light of the light source is entered to a side edge plane of the light-conducting member. As described above, the side edge plane of the light-conducting member constitutes a light incident plane. Alternatively, only a portion of the side edge plane may be used as a light incident plane. For instance, within the side edge plane, a portion of the light-conducting member on the side of the rear plane thereof is defined as the light incident plane. In this case, such a plane (namely, light non-enter plane) that couples the light incident plane to the front light-emitting plane of the light-conducting member is provided. As previously described, if the light-conducting member is constructed in such a manner that the light incident plane is separated from the front light-emitting plane, then the distance between the front light-emitting plane and the rear plane may be properly adjusted, so that a designing freedom of the light-conducting member can be increased. For example, an area of a reflecting portion formed on the rear plane of the light-conducting member may be increased/decreased, and an area of the front light-emitting plane may be increased/decreased.

Figure 1:
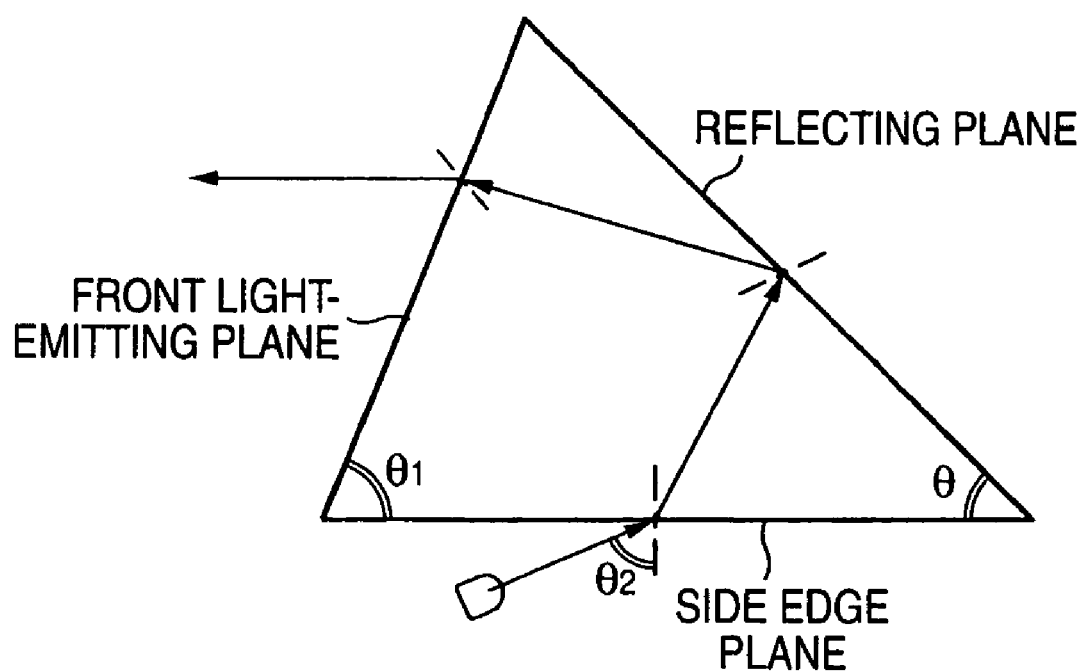
FIG. 1 is a diagram for explaining angles of planes that define reflecting portions.

The shape of the rear plane of the light-conducting member is a concave/convex shape. In this example, the "concave/convex shape" implies such a shape that a plurality of concave portions has been coupled to a plurality of convex portions. The reflecting portions are formed on the rear plane of the light-conducting member in such a manner that the reflecting portions are coupled to each other via a coupling portion. The reflecting portions have been inclined with respect to the front light-emitting plane in such a manner that a plane defined by the reflecting portions totally reflects incident light. For example, as indicated in FIG. 1, the light-conducting member can be formed in such a manner that an angle "$\theta$" defined between the reflecting plane defined by the reflecting portions and the side edge plane, another angle "$\theta_1$" defined between the front light-emitting plane and the side edge plane, an incident angle "$\theta_2$" of the light of the light source with respect to the side edge plane, and a refractive index "$n$" of the light-conducting member can satisfy the below-mentioned relative equation (formula 1):

$$\theta=[180°-\theta_1-\sin^{-1}\{\sin(90°-\theta_1/n)+\sin^{-1}\{(\sin\theta_2)/n\}\}]/2 \quad \text{[Formula 1]}$$

Based upon the above-described relative equation (1), the angles of the planes defined by the reflecting portions can be designed. If any of the reflecting portions can satisfy the above-described relative equation (1), then shapes of these reflecting portions are not limited, for example, these reflecting portions may be made in a rectangular shape, a circular shape, and the like, when being viewed on the plane. It should be understood that the shapes of the respective reflecting portions need not be made identical to each other.

The reflecting portions which have been coupled to each other via the coupling portion in the direction along which the reflecting portions are separated from the side edge plane of the light-conducting member are formed on the rear plane of the light-conducting member. As a result, the plural pieces of reflecting portions are formed on this rear plane. In this example, the expression "being changed in discontinuous manner" implies that the distances between the reflecting portions and the front light-emitting plane are not changed in a constant increasing rate, or a constant changing rate in the direction along which these reflecting portions are separated from the side edge plane. Typically speaking, the reflecting portions are formed on bottom planes of concave portions and top planes of convex portions, which are formed on the rear plane of the light-conducting member. It is preferable to form the adjoining reflecting portions in such a manner that a difference in distances between the adjoining reflecting portions and the front light-emitting plane becomes large. This reason is given as follows: That is, when the light-conducting member is observed from the front light-emitting plane, the thicknesses of the light-conducting member are furthermore emphasized. As a result, deep depth feelings and cubic effect feelings are increased, and crystal-touch feelings are also produced. The distances between the reflecting portions and the front light-emitting plane may be made 0.1 to 1.0 time larger than the thickness (namely, this thickness being defined as reference thickness) of the light-conducting member at the side edge plane of this light-conducting member, preferably may be made 0.15 to 1.0 times larger than this thickness.

There are some possibilities that the light-conducting member may be expanded/compressed to be deformed due to temperature changes. In such a case that a reflecting agent is coated on a surface of a light-conducting member so as to form reflecting portions, there is a risk that the reflecting portions are stripped since the light-conducting member is expanded/compressed. In particular, since this stripping phenomenon may conspicuously appear in such a light-conducting member having a thicker thickness, some measures must be taken with respect to the thermal expansion/compression of the light-conducting member. However, in the vehicle-purpose lighting tool of the present invention, since a portion of the rear plane of the light-conducting member is inclined so as to construct the above-described reflecting portions, the reflecting portions are not stripped due to the thermal expansion/compression of the light-conducting member, and moreover, the specific measures need not be taken with respect to the thermal expansion/compression of the light-conducting member.

It is preferable that when images of the plural reflecting portions are projected by light along a direction of an optical axis of a light source with respect to a plane located parallel to the side edge plane, respective projection images of the reflecting portions are not overlapped with each other. If such a structure is formed, then as to all of the reflecting portions, other reflecting portions are not present on an optical path of light that should be entered to the relevant reflecting portion. As a consequence, the light is not interrupted by other reflecting portions, so that all of the reflecting portions can receive the light over all of these regions. In addition, it is more preferable that a gap is not essentially produced between projection images adjacent to each other. This reason is given as follows: That is, the essentially entire incident light can be received by these reflecting portions, so that a utilizing efficiency of the light can be increased.

As previously described, the reflecting portions are coupled with each other via the coupling portion on the rear plane of the light-conducting member. The reflecting treatment has not been carried out with respect to the coupling portion. It is preferable that the coupling portion is provided with a plane which totally reflects thereon the external light entered via the front light-emitting plane into the light-conducting member, or another plane which passes therethrough the external light so as to re-enter the passed external light from the coupling portion into the light-conducting member. This reason is given as follows: That is, if the coupling portion is visually observed through the front light-emitting plane, then images of other planes of the light-conducting member are pictured, so that the deep depth feelings can be furthermore increased, and the design characteristic can be moreover improved. It should be noted that since the dimension of the coupling portion is changed, the distances among the reflecting portions may be properly adjusted.

In the light-conducting member used in the present invention, the thickness of this light-conducting member on the side of the side edge plane which constitutes a light incident plane is selected to be, for example, 15 mm to 50 mm, preferably 25 mm to 40 mm. If this thickness of the light-conducting member becomes excessively thin, then there is such a risk that a light-conducting efficiency is lowered, and an adverse influence is given to the light-conducting effect. On the other hand, if this thickness becomes excessively thick, then the resulting thickness of the light-conducting member becomes unnecessarily thick. As a result, this fact may conduct that a weight of the light-conducting member is increased and a manufacturing cost thereof is increased. On the other hand, a thickness of a plane that is located opposite to the side edge plane is selected to be, for instance, 3 mm to 20 mm, preferably 5 mm to 10 mm. As previously described, the light-conducting member having such a thicker thickness is employed, so that the following merit may be provided. That is, it is possible to avoid that the light source is observed through the light-conducting member from the external space.

Alternatively, an optical scattering agent may be contained in the light-conducting member. As a result, scattering of light within the light-conducting member may be prompted, so that such a light having a better luminance balance may be emitted from the front light-emitting plane. As the above-described optical scattering agent, for example, glass having a predetermined particle diameter, a metal such as aluminum, resins having the same refractive indexes as those of a lens and light, and also silica may be employed.

A total quantity of light sources to be employed may be determined by considering a dimension of a light-conducting member, emission luminance that is required in a lighting tool and the like. Normally, plural light sources are employed. For example, these plural light sources are arrayed on one column along the side edge plane of the light-conducting member.

There is no specific restriction in a sort of light sources, and therefore, LED lamps, bulbs, and the like may be employed. In particular, it is preferably that the LED lamps are employed. This reason is given as follows: That is, since the LED lamps are compact, decorated bodies may be made compact. In addition, these LED lamps have such a merit that while a heat generation amount is small, a thermal influence given to peripheral members of these LED lamps may be reduced. Moreover, the LED lamps have another merit that driving power thereof is low, and a long lifetime thereof may be achieved. Since there is no specific restriction as to sorts of these LED lamps, various types of LED lamps (for instance, bullet type, chip type, etc.) may be employed. In particular, it is desirable to employ such LED lamps having high directivity (for example, lenses). A color of a light source may be arbitrarily selected. While a plurality of light sources are employed, these plural light sources are controlled, so that emission colors thereof may be changed.

Various embodiments of the present invention will now be described.

EMBODIMENT 1

Figure 2:
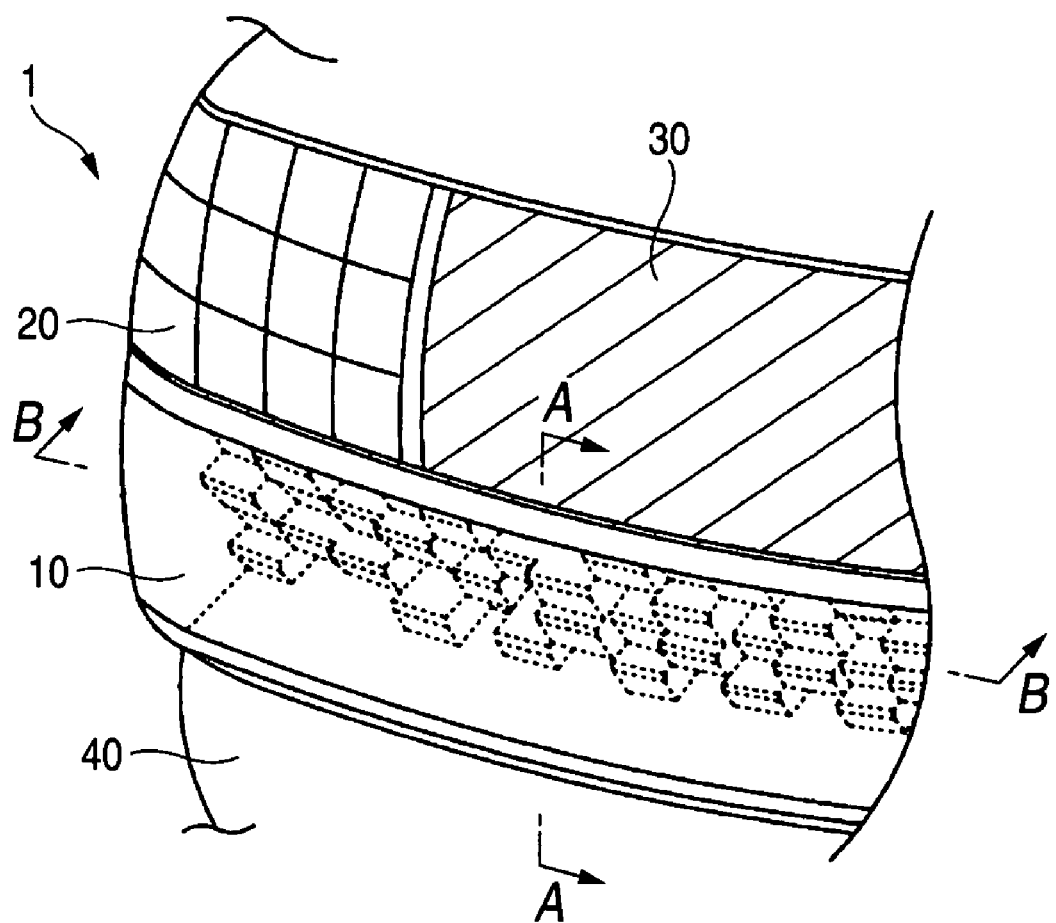
FIG. 2 is a perspective view for showing a rear combination lamp 1 according to an embodiment 1 of the present invention.

FIG. 2 is a perspective view for indicating a rear combination lamp 1 corresponding to an embodiment 1 of a vehicle-purpose lighting tool according to the present invention. The Rear combination lamp 1 is constituted of a tail/stop lamp unit 10 for performing a tail lamp indication and a stop lamp indication; a turn lamp unit 20 for performing a turn lamp indication; and a back lamp unit 30 for performing a back lamp indication.

Figure 3:
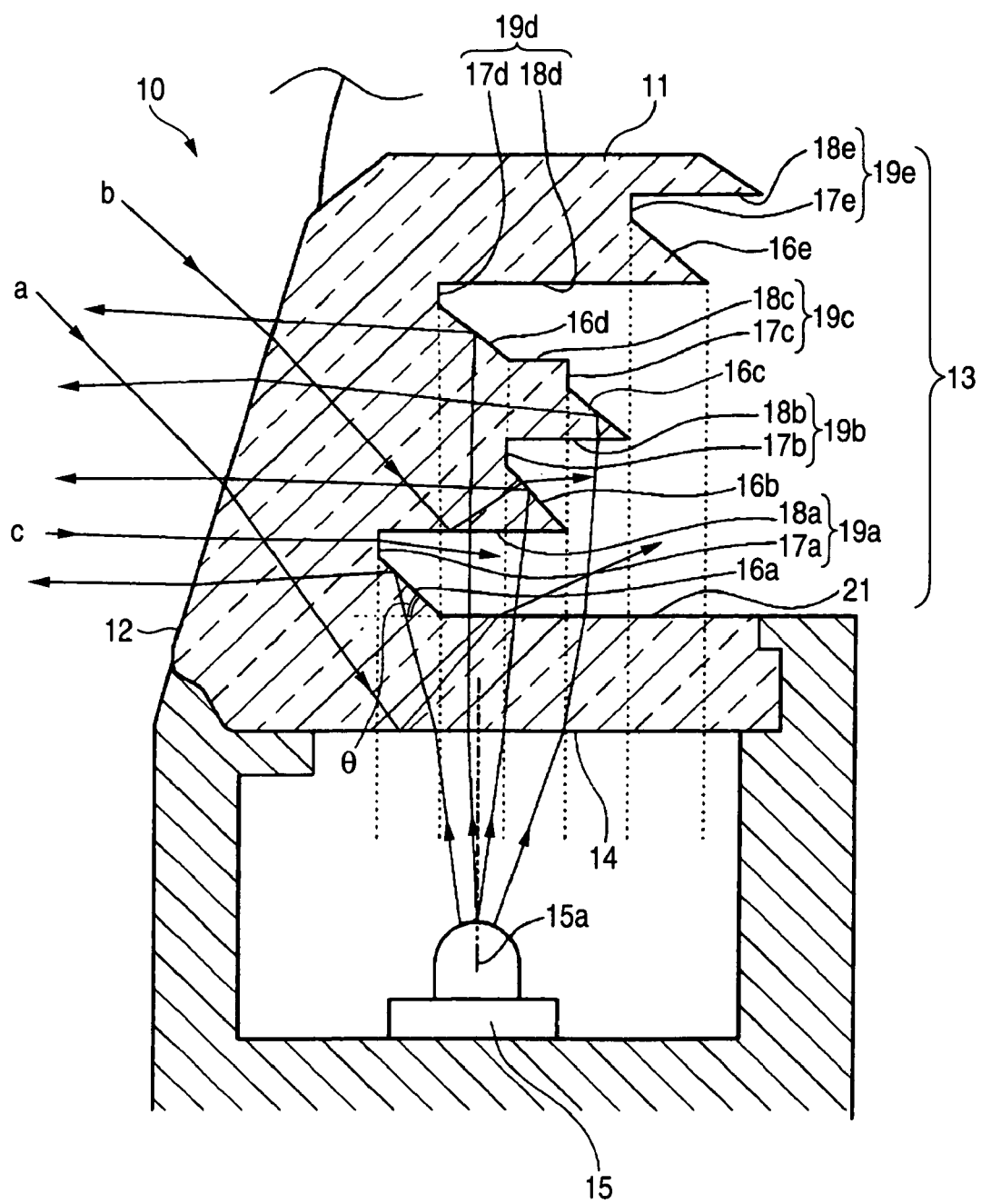
FIG. 3 is a sectional view, taken along an A-A line position of FIG. 2, namely, for showing a structure of a tail/stop lamp unit 10.
Figure 4:
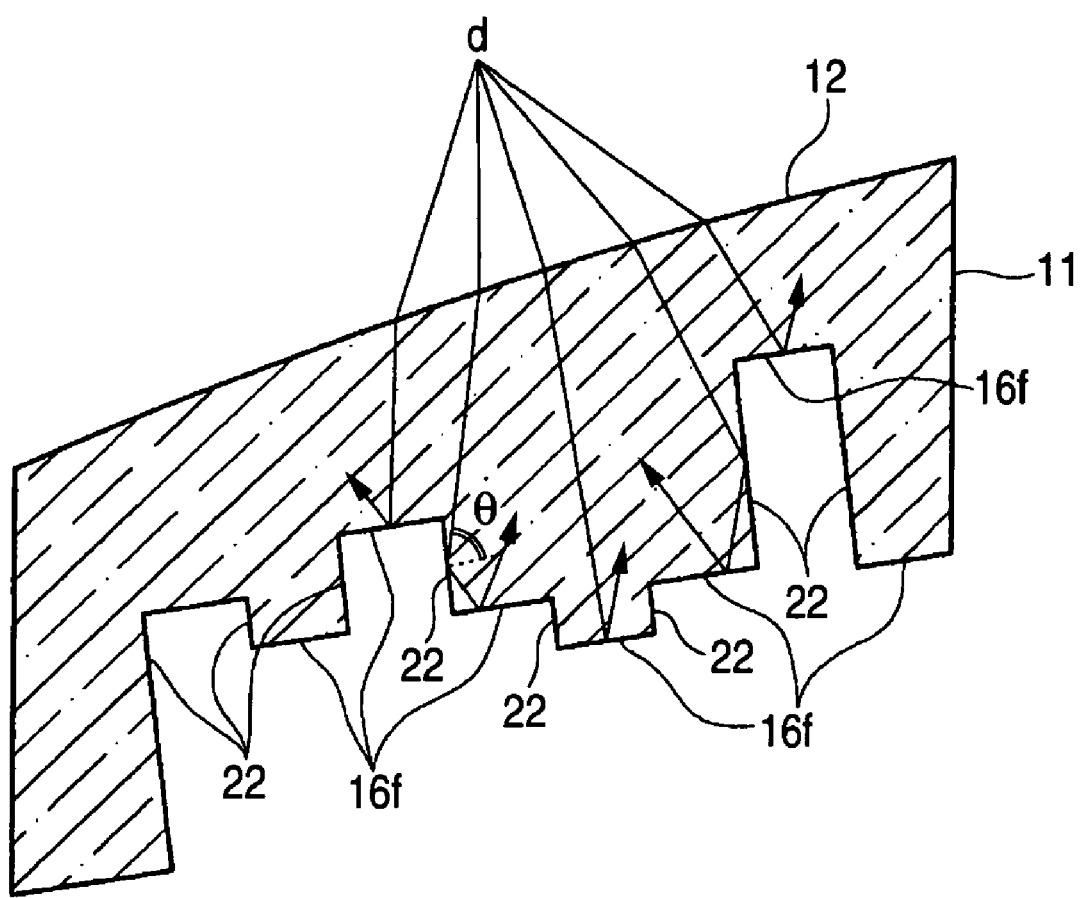
FIG. 4 is a sectional view, taken along a B-B line position of FIG. 2, namely, for showing a structure of the tail/stop lamp unit 10.

FIG. 3 is a sectional view for showing the rear combination lamp 1, taken along a line A-A indicated FIG. 2. FIG. 4 is a sectional view for representing the rear combination lamp 1, taken along a line B-B indicated in FIG. 2. As shown in FIG. 3, the tail/stop lamp unit 10 is equipped with a light-conducting member 11, and an LED (light-emitting diode) lamp 15. The light-conducting member 11 is made of an acrylic resin, and a refractive index thereof is approximately 1.5. A color of the LED lamp 15 belongs to a red color series, and this LED lamp 15 is arranged under the light-conducting member 11. A front light-emitting plane 12 of the light-conducting member 11 is made of a convex curved plane that is gradually curved. A radius curvature of this convex curved plane is 400 mm to 600 mm. On the other hand, a rear plane 13 of the light-conducting member 11 has such concave/convex shapes that a plurality of concave portions have been coupled to a plurality of convex portions. The rear plane 13 has been formed in such a manner that 5 pieces of reflecting portions 16a to 16e have been coupled to each other via coupling portions 19a to 19e in a direction along which the reflecting portions 16a to 16e are separated from a side edge plane 14 of the light-conducting member 11, namely are directed from a lower portion to an upper portion of the light-conducting member 11. The respective reflecting portions 16a to 16e have been inclined in such a manner that light of the LED lamp 15 is totally reflected to the side of the front light-emitting plane 12, and an inclination angle of each of these reflecting portions 16a to 16e is selected to be approximately 40 to 50 degrees (refer to FIG. 3). It should be noted that surface treatments for reflecting light have not been carried out on the respective reflecting portions 16a to 16e. The coupling portion 19a is provided with a first coupling portion 18a and a second coupling portion 17a. The first coupling portion 18a is located perpendicular to a direction which is directed along an optical axis of the LED lamp 15, and the second coupling portion 17a is located parallel to the direction along the optical axis of the LED lamp 15. Similar to the coupling portion 19a, the coupling portions 19b to 19e are equipped with first coupling portions 18b to 18e located perpendicular to the direction directed to the optical axis of the LED lamp 15, and second coupling portions 17b to 17e located parallel to the direction directed to the optical axis of the LED lamp 15. It should also be noted that reflecting treatments have not been performed with respect to the first coupling portions 18b to 18e, and the second coupling portions 17b to 17e.

As shown in FIG. 3, the reflecting portions 16a to 16e have been formed in such a manner that distances between the front light-emitting plane 12 and the respective reflecting portions 16a to 16e are not be changed in a continuous manner from the lower portion toward the upper portion of the reflecting portions 16a to 16e (namely, these distances are changed in discontinuous manner). In this example, distances between the front light-emitting planes 12 and the respective reflecting portions 16a to 16e are different from each other with respect to each of these reflecting portions 16a to 16e. Thus, as indicated by a broken line of FIG. 3, the respective reflecting portions 16a to 16e have been designed in such a way that when images of the respective reflecting portions 16a to 16e are projected on a plane along the direction of the optical axis 15a of the LED 15, which is located parallel to the side edge plane 14, there is essentially no gap between the adjoining projection images of the reflecting portions 16a to 16e. A thickness of the light-conducting member 11 with respect to the side edge plane 14 of the light-conducting member 11 is approximately 40 mm, while this thickness of the light-conducting member 11 corresponds to a distance between the front light-emitting plane 12 and the rear plane 13 of this light-conducting member 11. Among the distances between the front light-emitting plane 12 and the reflecting portions 16a to 16e, the shortest distance thereof (namely, reflecting portion 16a located at lowermost position at A-A line position of FIG. 2) is approximately 10 mm, whereas the longest distance thereof (namely, reflecting portion 16e located at uppermost portion at A-A line position of FIG. 2) is approximately 36 mm. In this case, the distances between the front light-emitting plane 12 and the respective reflecting portions 16a to 16e imply such distances between the centers of the respective reflecting portions 16a to 16e and the front light-emitting plane 12. It should also be understood that the reflecting portion 16a of the lowermost position has been coupled to a lower edge coupling portion 21 which is located parallel to the side edge plane 14.

As indicated in FIG. 4, the reflecting portions 16a to 16e have been coupled to each other via third coupling portions 22. The third coupling portions 22 are such planes located parallel to the light projection direction, while a reflecting treatment has not been performed on the third coupling portions 22.

In the tail/stop lamp unit 10 with employment of the above-described structure, when the LED lamp 15 is turned ON in response to an input signal supplied form the vehicle side, the tail/stop lamp unit 10 represents the below-mentioned light-emitting mode. As represented in FIG. 3, light emitted from the LED lamp 15 is entered from the side edge plane 14 of the light-conducting member 11 to the internal portion of the light-conducting member 11. The entered light is propagated through the light-conducting member 11 due to the light-conducting effect of the light-conducting member 11. Then, a portion of the incident light reaches the reflecting portion 16a located at the lowermost position of the rear plane 13 of the light-conducting member 11. The light reached the reflecting portion 16a is reflected to the side of the front light-emitting plane 12, and then, is emitted from this front light-emitting plane 12 to the external space. On the other hand, the other incident light passes through the lower edge coupling portion 21, and then is emitted from the light-conducting member 11 to the external space. The light emitted from the lower edge coupling portion 21 is traveled to the upper portion, and is again entered via the second coupling portions 18a to 18e into the internal portion of the light-conducting member 11. In other words, the light emitted from the LED lamp 15 is again entered into the internal portion of the light-conducting member 11 via such a space portion that is formed on the side of the rear plane 13 of the light-conducting member 11. The re-entered light is traveled toward the reflecting portions 16b to 16e located at the upper positions, and then, the re-entered light is reflected to the side of the front light-emitting plane 12 so as to be emitted from the front light-emitting plane 12 to the external space. As previously explained, by employing the light emitted from the front light-emitting plane 12 to the external space, the light-emitting indication is carried out. Since the reflecting treatment is not carried out with respect to the second coupling portions 18a to 18e, the light emitted from the LED lamp 15 may reach the reflecting portions 16b to 16e which are positioned at a region separated from the LED lamp 15. As a result, the light emitted from the LED 15 may also be emitted from the region separated from the LED lamp 15 on the front light-emitting plane 12.

In this case, reflecting portions 16a to 16e have been arranged in such a manner that when the reflecting portions 16a to 16e are projected along the direction of the optical axis 15a of the LED lamp 15 with respect to the plane parallel to the side edge plane 14, the respective projection images are arrayed without any gap therebetween and are not overlapped with each other. As a consequence, the light of the LED lamp 15 may reach entire planes of all of these reflecting portions 16a to 16e. As a result, since no loss of the light is produced, the utilization efficiency of the light may be increased. Furthermore, luminance of the light emission may be secured even in the region separated from the LED lamp 15 on the front light-emitting plane 12, so that a luminance balance may become superior.

Figure 5:
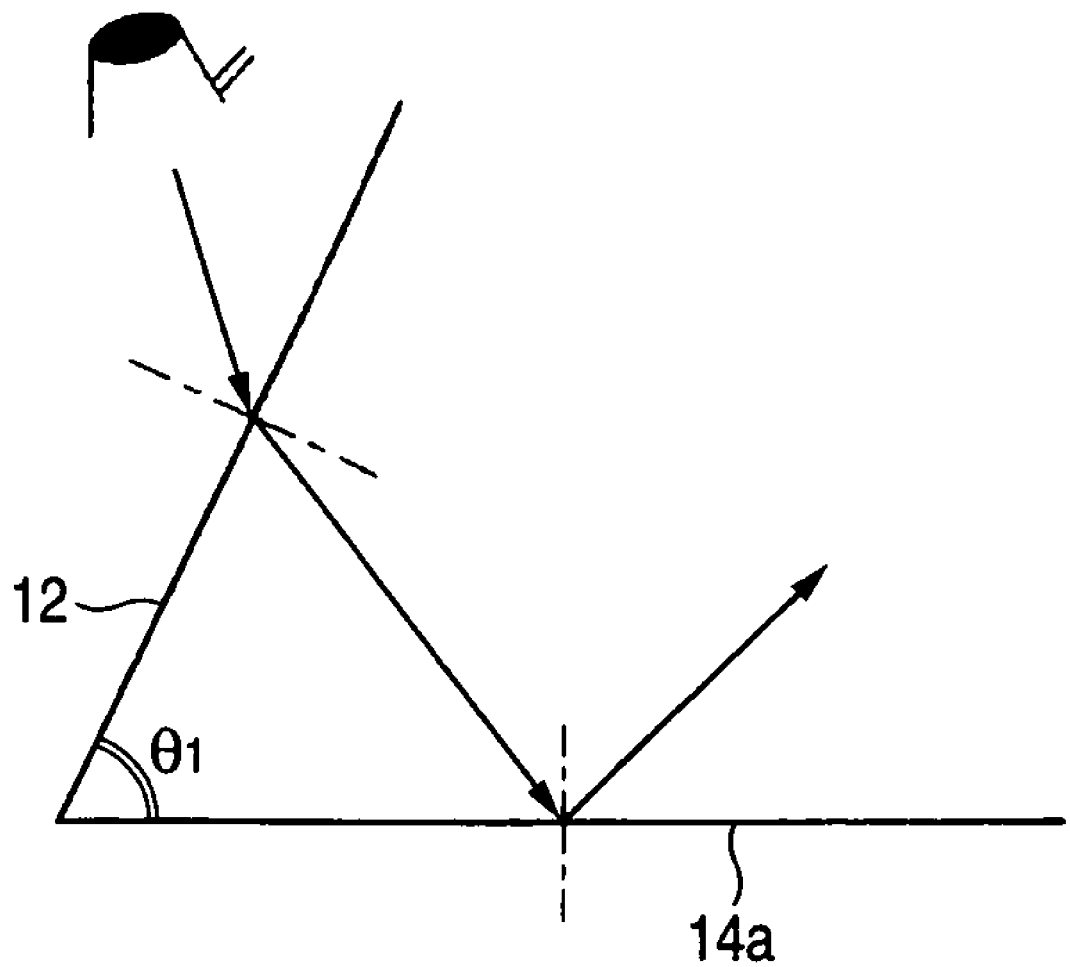

On the other hand, when the tail/stop lamp unit 10 is observed while the LED lamp 15 is turned OFF, the reflecting portions 16a to 16e are visually recognized via the front light-emitting plane 12. The distances between the respective reflecting portions 16a to 16e and the front light-emitting plane 12 are different from each other, so that the thick thickness portion of the light-conducting member 11 is not positioned adjacent to the thin thickness portion thereof. Such reflecting portions 16a to 16e are visually recognized, so that a difference among the thicknesses of the light-conducting member 11 may be emphasized. As a result, deep depth feelings and cubic effect feelings may be increased, and further, crystal-touch feelings may be produced. In the case that the tail/stop lamp unit 10 is observed at such a position "a" shown in FIG. 3, the LED lamp 15 is not visually recognized due to total reflections on the side edge plane 14 of the light-conducting member 11. Similarly, in the case that the tail/stop lamp unit 10 is observed at such a position "b" shown in FIG. 3, the LED lamp 15 is not visually recognized due to total reflections on the second coupling portion 18a. When the tail/stop lamp unit 10 is observed at a position "c" of FIG. 3, the rear portion of the light-conducting member 11 may be viewed from the first coupling portion 17a, and therefore, the presence of the LED lamp 15 may not be grasped which is similar to those when the tail/stop lamp unit 10 is observed from the position "a" and the position "b." Also, as represented in FIG. 4, even in such a case that the tail/stop lamp unit 10 is observed from a position "d" of FIG. 4, the light of the LED lamp 15 is totally reflected by the reflecting plane 16f and the third coupling portion 22, so that the presence of the LED lamp 15 cannot be grasped. In order that the above-explained total reflection may occur, as shown in FIG. 5, assuming now that the refractive index of the light-conducting member 11 is "n", an angle "$\theta_1$" defined between the front light-emitting plane 12 and the side edge plane 14 (otherwise, second coupling portions 18a to 18e, and second coupling portion 22) must satisfy a predetermined condition, namely, the below-mentioned relative formula (in case that such a condition is established that side edge plane 14, second coupling portions 18a to 18e, and third coupling portion 22 are planes):

$$\theta_1 > 2\sin^{-1}(1/n) \quad [\text{Formula 2}]$$

If the light-conducting member 11 is designed in such a manner that the entire portion of the front light-emitting plane 12 can satisfy the above-described condition, there is no possibility that the LED lamp 15 is directly and visibly recognized via the front light-emitting plane 12 irrespective of the position of the view point. As previously explained, it is desirable that the presence of the LED lamp 15 is completely concealed. However, if such a fact that the range of the view point position of the observing person is limited when the rear combination lamp 1 is used is considered, then there is no practical problem even when a portion (for instance, edge portion) of the front light-emitting plane 12 cannot satisfy the above-described condition. As a consequence, the rear combination lamp 1 may be alternatively constructed in such a manner that an angle "$\theta_1$" defined between the front light-emitting plane 12 and the side edge plane 14 (otherwise, second coupling portions 18a to 18e, and third coupling portions 22) must satisfy a predetermined condition, namely, the below-mentioned relative formula (3):

$$\theta_1 > 2\sin^{-1}(1/n) - 10° \quad [\text{Formula 3}]$$

Alternatively, such a region that the LED lamp 15 is directly viewed through this region from the external space may be actively formed. With employment of this alternative structure, since the view point position is changed, such an unexpected characteristic may be realized that the LED lamp 15 may be suddenly viewed, or the LED lamp 15 may be suddenly concealed while the LED lamp 15 is being viewed.

On the other hand, in order that the total reflection may readily occur, it is preferable that the side edge plane 14 is made of a smoothing plane. If the side edge plane 14 is made of the smoothing plane, then the light emitted from the LED lamp 15 may be effectively captured into the internal portion of the light-conducting member 11, and furthermore, the traveling directions of the captured light may be matched with each other. As previously described, it is also desirable that the side edge plane 14 is made of the smoothing plane in view of both the light utilizing rate and the light distribution control. In view of similar aspects, both the second coupling portions 18a to 18e and the third coupling portions 22 may be alternatively made of smoothing planes.

In this embodiment 1, since the side edge plane 14, the second coupling portions 18a to 18e, and the third coupling portions 22 are made of the flat planes, the superior light distribution of the light captured in the light-conducting member 11 is realized. It should also be noted that the shapes as to the side edge plane 14, the second coupling portions 18a to 18e, and the third coupling portions 22 are not limited only to the flat planes, for example, may be alternatively constructed by arbitrary curved planes. Moreover, these side edge plane 14, second coupling portions 18a to 18e, and third coupling portions 22 may be alternatively arranged by combining planes having different shapes with each other.

On the other hand, in this embodiment 1, the LED lamp 15 has been arranged under the light-conducting member 11 so as to reduce the thickness of the tail/stop lamp unit 10 along the forward and backward direction thereof. As a result, the improvement in the design characteristic may be achieved.

As previously described, in the tail/stop lamp unit 10, the light source (LED lamp 15) is not visually recognized from the external space (namely, outside front light-emitting plane 12), and moreover, the light emission capable of reducing the luminance fluctuation can be achieved, so that the tail/stop lamp unit 10 can have the superior design characteristic. It should also be noted that in the turn lamp unit 20 and the back lamp unit 30, the respective indications are performed by employing colored covers and bulbs which function as light sources.

Figure 6:
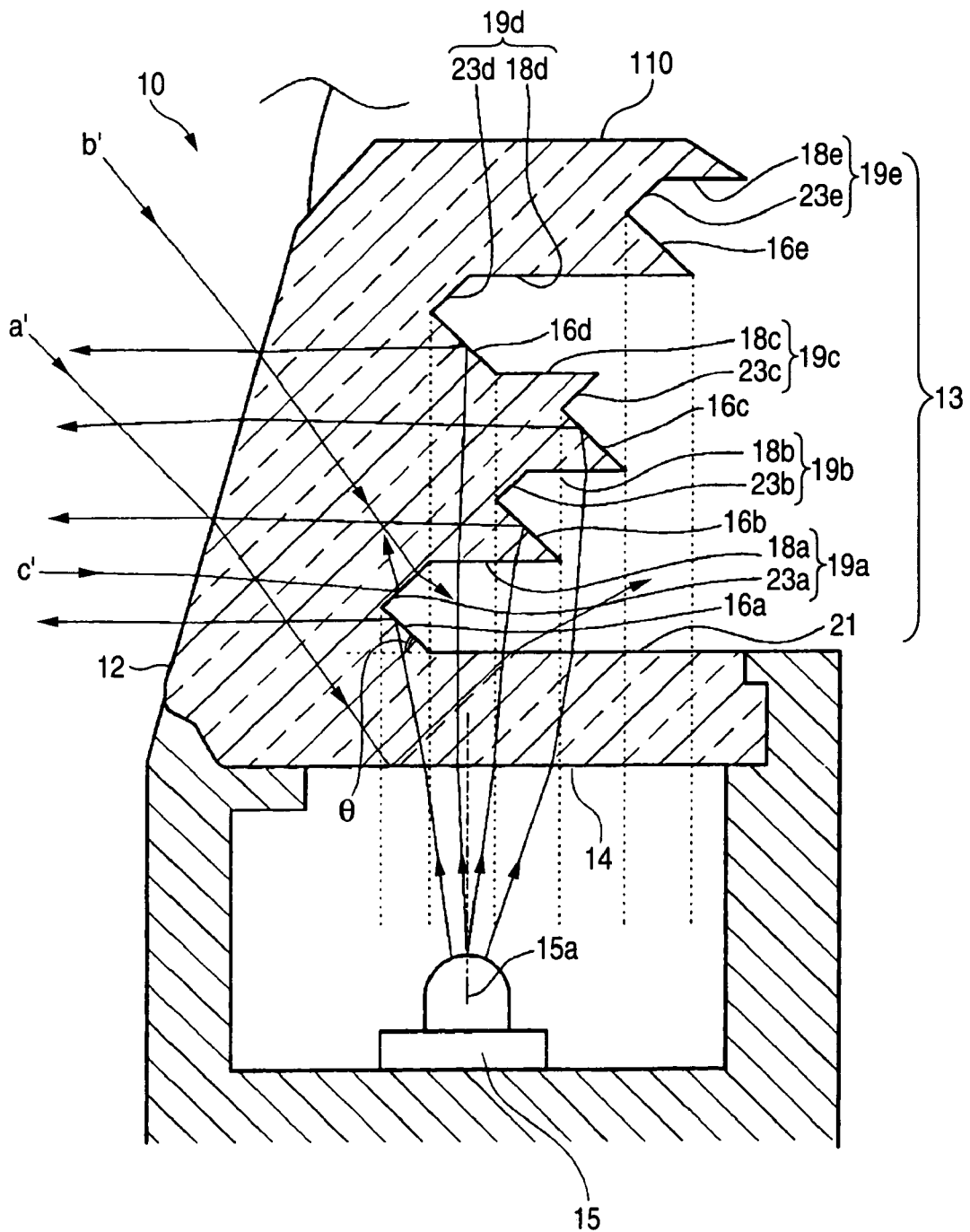
FIG. 6 is a sectional view for showing another embodiment of the present invention, namely, for indicating a light-conducting member 110 equipped with first coupling portions 23a to 23e as inclined planes.

In the above-described embodiment 1, the first coupling portions 17a to 17e have been constructed as the planes located perpendicular to the side edge plane 14, but the present invention is not limited thereto. FIG. 6 is a longitudinal sectional view for representing a light-conducting member 110 corresponding to a modification of the above-described light-conducting member 11. It should also be noted that the same reference numerals for indicating the light-conducting member 11 will be employed as those for denoting the essentially same members. 5 pieces of reflecting portions 16a to 16e have been formed on a rear plane 13 of the light-conducting member 110 in such a manner that these reflecting portions 16a to 16e are coupled to each other via the coupling portions 19a to 19e in a direction along which these reflecting portions 16a to 16e are separated apart from the side edge plane 14 of the light-conducting member 110, namely apart from the lower portion toward the upper portion of these reflecting portions 16a to 16e. The coupling portion 19a is provided with a first coupling portion 23a and a second coupling portion 18a, and the first coupling portion 23a is inclined on the side of the upper plane thereof with respect to the optical axis 15a of the LED lamp 15. Similarly, the coupling portions 19b to 19e are equipped with first coupling portions 23b to 23e, and second coupling portions 18b to 18e, which have been formed in similar modes to the mode of the first coupling portion 23a. Also, reflecting treatments have not been carried out with respect to the first coupling portions 23a to 23e.

While the first coupling portions 23a to 23e have been inclined on the upper plane side of the light-conducting member 110 with respect to the front light-emitting plane 12, the first coupling portions 23a to 23e totally reflect thereon light which is externally entered via the front light-emitting plane 12 into the light-conducting member 110 toward the upper portions thereof in response to positions to be observed, or pass therethrough the externally entered light toward the rear portion of the light-conducting member 110. As shown in FIG. 6, when the light-conducting member 110 is observed from a position "a'", the LED lamp 15 is not visually recognized similar to the case of the light-conducting member 11. When the light-conducting member 110 is observed from a position "b'", the rear portion of the light-conducting member 110 is visually recognized from the first coupling portion 23a. On the other hand, when the light-conducting member 110 is observed from a position "c'", an image of the upper plane side of the light-conducting member 110 is pictured. As previously explained, if the image of the upper plane of the light-conducting member 110 is pictured, or the rear portion thereof is visually recognized, depending upon the positions to be observed, then various sorts of viewing aspects may be provided. As a result, the deep depth feelings may be furthermore increased, so that the design characteristic may be moreover improved. Even when such a light-conducting member 110 is used, the LED lamp 15 is not visually recognized from the tail/stop lamp unit 10, resulting in a superior design characteristic.

Figure 7:
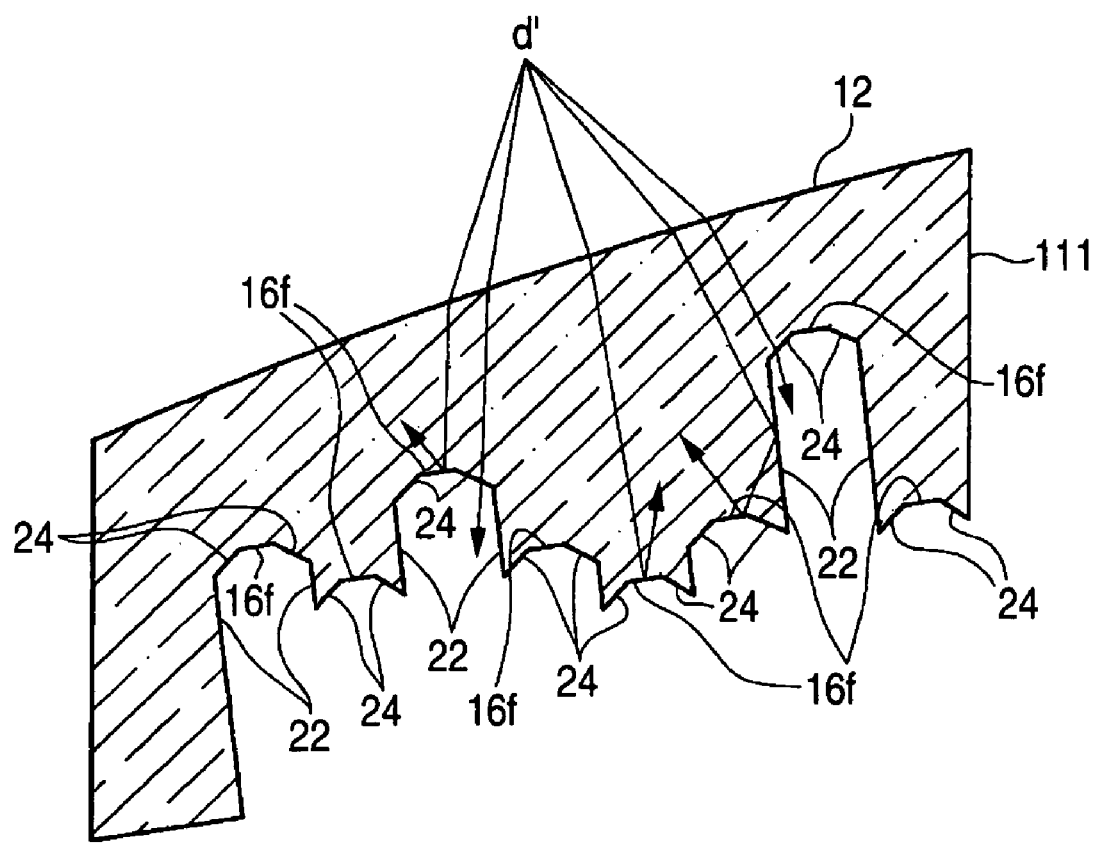
FIG. 7 is a sectional view for showing a further embodiment of the present invention, namely, for indicating a light-conducting member 111 equipped with fourth coupling portions 24a to 24e as inclined planes.
Figure 8:
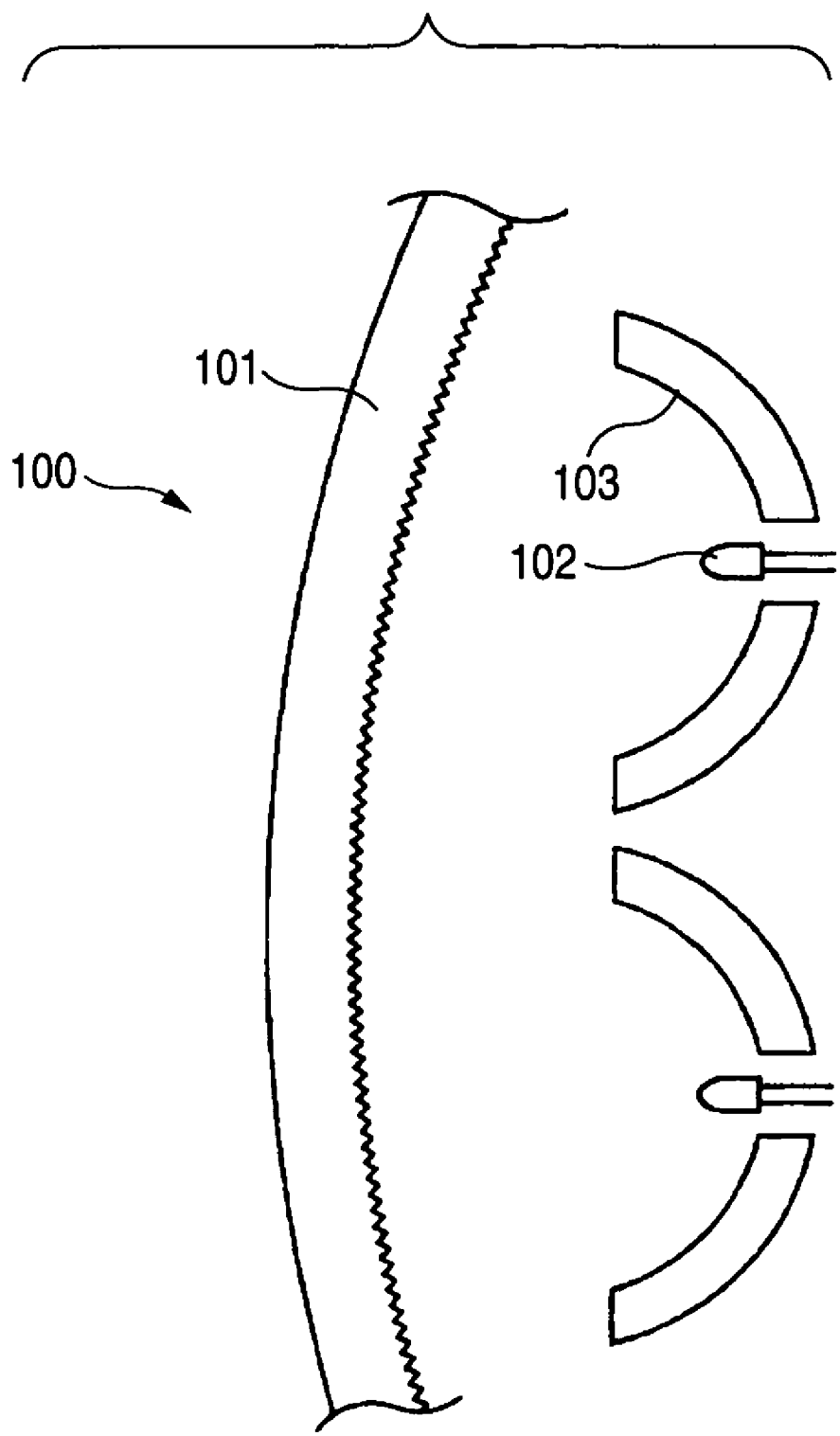
FIG. 8 is the structural example of the conventional rear combination lamp.

FIG. 7 is a lateral sectional view for showing a light-conducting member 111 according to another modification of the present invention. The light-conducting member 111 is equipped with fourth coupling portions 24 between reflecting portions 16f and third coupling portions 22. While the fourth coupling portions 24 have been formed to be inclined backwardly with respect to the front light-emitting plane 12, the fourth coupling portions 24 totally reflect thereon light which is externally entered via the front light-emitting plane 12 into the light-conducting member 111 toward the lateral direction in response to positions to be observed, or pass therethrough the externally entered light toward the rear portion of the light-conducting member 111. As a consequence, similar to the light-conducting member 110, if an image of the plane of the light-conducting member 111 along the lateral direction is pictured, or the rear portion thereof is visually recognized, then various sorts of viewing aspects may be provided. As a result, the deep depth feelings may be furthermore increased, so that the design characteristic may be moreover improved.

In the above-described embodiments, the light has been conducted from the lower portions of the light-conducting members. However, the present invention is not limited only to the above-described structure. Alternatively, the vehicle-purpose lighting tool may be arranged in such a manner that the light is conducted from the upper portion of the light-conducting member, or from the lateral direction.

Also, the present invention is not limited only to the above-described materials of the light-conducting members, namely, light-conducting members manufactured by employing such light-conducting materials whose refractive indexes are approximately 1.4 to 1.8 may be alternatively employed. Concretely speaking, in addition to the acrylic resin employed in the above-described embodiments, a polycarbonate resin, an epoxy resin, glass, and the like may be employed.

The present invention is utilized in lighting tools for various sorts of vehicles (cars, buses, trucks etc.). Concretely speaking, the present invention may be applied to rear combination lamps, tail lamps, stop lamps, high-mounted stop lamps, head lamps, fog lamps, and the like.

The present invention is not limited only to the above-described embodiments of the present invention, and the descriptions thereof. Various sorts of modifications may be covered by the present invention with such a technical scope that is readily conceivable by ordinarily skilled engineers without departing from the scope of claims for a patent.

It should also be understood that all of contents with respect to thesises, opened patent applications, patent publications, and the like, which have been disclosed in the present specification, are employed herein as references.

What is claimed is:

1. A vehicle-purpose lighting tool, comprising:
    a light-conducting member having a front light-emitting plane, a rear plane having a concave/convex shape, and a side edge plane; and
    a light source arranged at a position opposite to the side edge plane,
    wherein external light which is entered via the front light-emitting plane into the light-conducting member, a portion of the external light which is directly traveled to the side edge plane is totally reflected on a boundary plane of a side edge plane portion,
    wherein a plurality of reflecting portions are formed on the rear plane and are coupled to each other via a coupling portion in such a direction that the reflecting portions are separated apart from the side edge plane-side,
    wherein distances between the plurality of reflecting portions and the front light-emitting plane are changed in a discontinuous manner along the separating direction, and
    wherein an angle "θ" defined between a plane defined by the reflecting portions and the side edge plane, another angle "θ1" defined between the front light-emitting plane and the side edge plane, an incident angle "θ2" of the light of the light source with respect to the side edge plane, and a refractive index "n" of the light-conducting member can satisfy the below-mentioned relative equation:

θ=[180°−θ1−sin−1{sin(90°−θ1/n)+ sin−1{(sinθ2)/n}}/2.

2. The vehicle-purpose lighting tool as claimed in claim 1, wherein said coupling portion is substantially transparent.

3. The vehicle-purpose lighting tool as claimed in claim 1, wherein when images of said reflecting portions are projected by light along a direction of an optical axis of said light source with respect to a plane located parallel to said side edge plane, respective projection images of said reflecting portions are not overlapped with each other.

4. The vehicle-purpose lighting tool as claimed in claim 1, wherein a gap is not essentially produced between said projected images adjacent to each other.

5. The vehicle-purpose lighting tool as claimed in claim 1, wherein said coupling portion is provided with a plane which totally reflects thereon the external light entered via said front light-emitting plane into said light-conducting member, or another plane which passes therethrough said external light so as to re-enter the passed external light from said coupling portion into said light-conducting member.

6. The vehicle-purpose lighting tool as claimed in claim 1, wherein said light source comprises an LED (Light-emitting Diode) lamp.

* * * * *